United States Patent Office 3,491,139
Patented Jan. 20, 1970

3,491,139
PREPARATION OF UNSATURATED NITRILES BY AMMOXIDATION OF SATURATED ALDEHYDES IN THE PRESENCE OF A GROUP VIII METAL CATALYST
Giovanni Biale, Placentia, Calif., assignor to Union Oil Company of California, Brea, Calif.
No Drawing. Filed Mar. 14, 1967, Ser. No. 622,909
Int. Cl. C07c 121/04, 121/30
U.S. Cl. 260—465.9                    16 Claims

ABSTRACT OF THE DISCLOSURE

The heterogeneous catalysis of a single step conversion of aldehydes to unsaturated nitriles by contacting the aldehyde with ammonia and oxygen in the presence of a halogenated hydrocarbon promoter and a catalyst comprising a Group VIII metal, oxide or salt thereof. Cocatalysts that can also be used are Group VI–B metals, oxides or salts thereof. The catalytic components can be distended on an inert support. Preferably, water vapor is introduced into the reaction zone. Unsaturated nitriles that can be produced by this method include acrylonitrile, methacrylonitrile, etc., which are useful as monomers in polymerization.

The invention

Unsaturated nitriles have been prepared by heterogeneous catalysis by the oxidation of saturated nitriles in the presence of various noble metal catalysts such as described in Patents 2,701,260 and 2,734,909. The saturated nitriles can be prepared by the reaction of the saturated acid and ammonia or by the reaction of the saturated aldehyde with ammonia in the presence of suitable catalysts. Unsaturated nitriles have also been prepared by the contacting of an olefinic hydrocarbon or an unsaturated aldehyde with ammonia in the presence of a suitable catalyst.

All these processes have heretofore performed only a single conversion, i.e., either oxidation of the saturated nitrile to the unsaturated nitrile or the formation of the nitrile by reaction with ammonia. Heretofore, these methods have required the use of ethylenically unsaturated reactants or have employed several stages in the preparation of the unsaturated aldehyde.

I have now found that saturated aldehydes can be converted to unsaturated nitriles in a single step by heterogeneous catalysis of simultaneous dehydrogenation and oxidative ammonolysis to prepare an unsaturated nitrile in a single step conversion. I have found that this reaction can be catalyzed by Group VIII metals of either the iron or noble metal group in the presence of a minor amount of a halogenated hydrocarbon promoter. I have further found that Group VI metals, oxides or salts thereof, serve as cocatalysts for the oxidation. In the most preferred embodiment I have found that the combination of nickel and molybdenum components distended on a suitable inert support exhibit a high activity for the catalysis of the conversion of aldehydes to unsaturated nitriles.

The organic reactant used in my process is a saturated aldehyde having 3 to about 15 carbons and corresponding to the following structure:

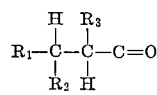

wherein $R_1$, $R_2$ and $R_3$ are hydrogen; alkyl, e.g., methyl, ethyl, isopropyl, butyl, amyl, etc.; aryl, e.g., phenyl, naphthyl, xylyl, tolyl, cumenyl, etc.; or halo, e.g., chloro, bromo, iodo, fluoro; etc.

Examples of suitable reactants include propionaldehyde, butyraldehyde, isobutyraldehyde, valeroaldehyde, isovaleroaldehyde, hexanal, heptanal, octanal, decanal, 2-phenylpropionaldehyde, 3-naphthylpropionaldehyde, 3-xylylbutyraldehyde, 4-cumenylbutyraldehyde, 4-phenylvaleroaldehyde, etc., 2-chloropropionaldehyde, 3-bromobutyraldehyde, 5-fluorovaleroaldehyde, etc.

The active component for the catalysis is a metal, oxide or salt thereof of a Group VIII metal. Included in the active components are the iron group metals, iron, nickel and cobalt, as well as the noble metals including the palladium subgroup comprising palladium, rhodium and ruthenium and the platinum subgroup including platinum, osmium and iridium.

The catalyst can also optionally contain a cocatalyst which is a metal, oxide or salt of a Group VI metal including molybdenum, chromium and tungsten. Specific examples of combinations of catalytically active materials include the combination of cobalt and molybdenum, nickel and molybdenum, nickel and tungsten, nickel and chromium, palladium and molybdenum, platinum and tungsten, etc. The preferred combination because of its demonstrated greater activity comprises the combination of nickel and molybdenum.

The catalytic components can be employed as the free metal, oxide or salt thereof. The reaction is performed under oxidizing conditions at elevated temperatures and, accordingly, the catalytic components will to some extent be converted to the oxides regardless of the state of these catalyst components used for initiation of the reaction. Examples of suitable salts of the metals include the halides, nitrates, sulfates, phosphates, etc.

The catalytic components can be employed neat or distended upon a suitable carrier which can be any solid that is inert to the reaction including titania, zirconia, alumina, silica, etc., or combinatons of these materials. Examples include alumina, silica stabilized alumina (1–15 percent silica) described in Patent 2,437,532, the aluminum silicates, clay, naturally occurring or synthetically prepared zeolites such as chabazite, gmelenite or faujasite as well as synthetic zeolites. These materials are partially dehydrated crystalline composition of silica and alumina and contain quantities of one or more exchangeable cations such as sodium, potassium, hydrogen, magnesium, calcium, etc. The compositions and their preparation are described in Patents 2,882,243 and 2,-882,244 and are characterized by crystal pores of relatively uniform diameter between about 5 and 14 A. Several crystal forms of such molecular sieves are now available and suitable for use herein as the carrier such as the "X," "Y," "L," "J" crystal types. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of the Group VIII or Group VIII and VI–B metal salts in the manner hereafter set forth.

The catalyst particle size can vary over wide limits from about 0.5 inch to about 1 micron average diameter. The particle size selected depends on the type of solid-vapor contacting employed in the reaction zone. A disperse gas phase reaction would employ the very fine particles passing about a 325 mesh screen. Use of a fluidized bed reactor would require use of particles passing a 20 but retained on a 400 mesh screen. Packed bed reactors, which are preferred, would use the larger diameter particles having diameters from 0.05 to 0.5 inch, preferably from about 0.1 to 0.25 inch. The specific surface of the catalyst can also vary widely, from about 10 to 800 square meters per gram.

The promoter for the reaction is a halogen, hydrogen halide or a halogenated hydrocarbon. It is believed that these materials function as free radical precursors and, at the temperatures of the reaction, form free radicals which initiate the reaction. Examples of suitable materials include the halogens, i.e., chlorine, bromine, fluorine and iodine as well as the hydrogen halides, hydrogen chloride, hydrogen bromide, hydrogen fluoride and hydrogen iodide and the halogenated hydrocarbons having from 1 to about 25 carbons, preferably 1 to about 5 carbons, such as chloroform, carbon tetrachloride, ethyl chloride, trichloroethane, methyl iodide, ethylenedichloride, trifluorotrichloroethane, fluorotrichloromethane, bromotrifluoroethane, ethylenechlorobromide, chloropentafluoroethane, dibromoethane, diiodoethane, hexachloroethane, bromopropane, diiodopropane, fluorobutane, diiodohexane, chloroeicosane, chlorohexodecane, etc. The amount of the halogenated promoter can vary from about 0.001 to about 5 weight percent based on the reactant feed. Preferably the amount employed is from about 0.01 to about 0.5 weight percent of the reactant feed.

The catalytic components when distended on a solid carrier are employed in amounts from about 0.5 to about 25 weight percent of the final catalyst. Preferably, the catalytic components are employed in concentrations from about 2 to about 15 weight percent based on the final catalyst. The catalyst components can be distended on the carrier by conventional methods for preparation of catalyst, e.g., impregnation, coprecipitation, etc. In the impregnation method, the solid carrier can be treated, immersed or washed with an aqueous solution of a water soluble salt of the active components, e.g., nickel nitrate, and the solution can be treated to precipitate the active component with a precipitant such as a strong base or a precipitating anion such as phosphoric acid. The components can also be impregnated on the carrier from the aqueous solution by evaporation of the solution to dryness on the carrier. The active components can be co-impregnated or the catalyst can be impregnated with one of the active components, dried, calcined to convert the active component to the oxide, and thereafter impregnated with the cocatalyst or re-impregnated with additional quantities of the single active component. Techniques for preparation of these catalysts can comprise simultaneous impregnation or a series of repeated impregnations such as impregnation of the nickel component followed by successive impregnations of the molybdenum component then the nickel component and repeated impregnation with the molybdenum component if desired, to raise the concentration of the components of the catalyst to the desired high levels. A suitable method of preparation of a nickel and molybdenum catalyst appears in Patent 3,285,860. Simultaneous impregnation of nickel and molybdenum can be performed on an alumina pretreated with phosphoric acid.

The active components can also be coprecipitated onto the carrier in the manner described in Patent 2,393,288 where an aqueous solution of an ammonium molybdate or chromate is mixed with an aqueous solution of a soluble salt of the Group VIII metal, e.g., the nitrate or sulfate. The hydrous gel carrier, e.g., alumina, is suspended in the solution of the Group VIII metal salt prior to addition of the ammonium salt. Addition of the latter results in coprecipitation of the Group VIII and VI metal components on the carrier.

After the coprecipitation or the impregnation, the solid is dried at temperatures from about 100° to about 800° C. It is thereafter preferred to calcine the catalyst by heating to a temperature up to about 800° to 1500° C. in an oxidizing environment to convert a catalyst component to the oxides. If desired, however, the catalyst components can be used directly in the form of their salts resulting from the impragnation or coprecipitation preparation. The calcined catalyst can also be reduced to the free metal state by contacting with hydrogen at a temperature from about 150° to about 450° C. to thereby reduce the metal oxide components to the free metal in the catalyst. The catalysts are active in either form; however, the oxides are preferred.

The reaction is performed by contacting the aldehyde, ammonia and oxygen in the presence of the catalyst and the promoter. It is preferred to employ vapor phase reaction conditions and the aldehyde is vaporized and supplied to the reaction zone as a vapor. The oxygen, aldehyde and ammonia are introduced into the reaction zone and the reaction can be controlled by controlling the relative concentration of the aldehyde, ammonia or oxygen by conducting the reaction in the presence of an inert gas such as nitrogen, carbon dioxide, etc. The relative feed rates in parts by volume that can be used are as follows:

|  | Broad | Preferred |
| --- | --- | --- |
| Oxygen | 1–35 | 1–15 |
| Ammonia | 1–40 | 5–20 |
| Aldehyde | 0.1–15 | 1–10 |
| Inert | 50–95 | 65–90 |

The preferred ratio of aldehyde to each of the other reactants, i.e., ammonia and oxygen is from 0.75 to 1.0.

In the preferred embodiment, the oxidation and ammonialysis are performed in a single stage in a continuous fashion by continuously introducing the reactant, ammonia and oxygen into the reaction zone to contact the supported metal catalyst at liquid hourly space velocities from about 0.1 to about 10 liquid aldehyde volumes per volume of catalyst per hour; preferably from about 0.5 to about 5 volumes per volume of catalyst per hour. The reaction zone is maintained at a temperature from about 200° to about 800° C.; preferably from about 350° to about 500° C. The pressure of the reaction zone can be varied from about atmospheric to about 1000 atmospheres as desired; preferably pressures from about 10 to about 100 atmospheres are employed.

The reactants and crude reaction product are continuously withdrawn from the reaction zone, cooled to condense the liquid products, and the unreacted gases comprising ammonia, oxygen, inert diluent and any uncondensed organic reactant can be recycled to further reaction. Prior to recycling, all or a portion of the reactant gases can be passed through a suitable purification step to remove volatile and gaseous reaction byproducts such as carbon oxides. These can be recovered by treatment with a conventional technique such as adsorption with a monoethanolamine solution, etc., to remove the carbon dioxides prior to recycling.

The crude reaction product from the reaction will contain some unreacted organic feed, partially converted materials such as saturated nitriles or imines, etc. The incompletely converted materials can also be separated in the purification of the desired product, usually by distillation and these incompletely converted materials can also be recycled to the reaction zone. The desired unsaturated nitrile is recovered in a high degree of purity by conventional distillation techniques.

In a preferred embodiment, my invention employs the addition of water vapor to the reaction zone to aid the conversion to the unsaturated nitrile. The manner in which the water vapor aids the conversion is not clearly understood; however, it is believed that the water vapor moderates the reaction and permits the use of relatively high temperatures and precludes the formation of the imine that is formed by reaction of the aldehyde feed with the intermediate nitrile. Water vapor is supplied to the reaction zone in an amount sufficient to provide a volume percent concentration therein from about 1 to about 25 percent of the total vapor phase in the reaction zone. Preferably, the water vapor is employed in an amount from about 3 to about 10 volume percent of the vapors in the reaction zone.

The mode of practice of my invention will now be illustrated by the specific examples set forth in the following paragraphs:

EXAMPLE 1

In this and succeeding experiments a continuous vapor phase reaction was practiced by placing approximately 15 milliliters of the indicated catayst in a vertical reactor approximately ½ inch in diameter and 4 to 6 inches in length. Quartz chips were mixed with the catalyst particles and the mixture was packed in the reactor. The reactor was placed in a Vycor electrically heated furnace. The aldehyde feed was vaporized in a stream of nitrogen by introducing the aldehyde into a tube packed with glass beads countercurrent to the flow of nitrogen therethrough and the flow was metered through a flowmeter into the reaction zone. Oxygen and ammonia were introduced through flowmeters to mix with the aldehyde nitrogen stream at the inlet at the upper end of the reaction zone. The temperature of the reaction zone was indicated by a thermocouple located in the center of the reactor and the reactor was maintained at the desired temperature with the electrically heated furnace.

The products were withdrawn from the bottom of the reactor and discharged into a container immersed in a mixture of Dry Ice and acetone. The vapor stream from the Dry Ice acetone trap was passed through a weighed amount of "Ascaride" solid. The weight increases of the "Ascaride" determined the quantity of carbon dioxide formed in the reaction. The products condensed in the Dry Ice acetone trap were analyzed by gas chromatography.

In the first experiment, 15 milliliters of a catalyst having an average diameter of $\frac{1}{16}$ inch and comprising 3.35 weight percent nickel oxide and 15.2 weight percent molybdenum oxide on an alumina support that contained 5 percent silica, were mixed with 15 milliliters of quartz chips (10–14 mesh) and the mixture was packed in the reactor and heated to 315° C. Isobutyraldehyde was vaporized and introduced into the reaction zone at a rate of $2.2 \times 10^{-3}$ moles per minute. Chloroform in an amount comprising 0.3 weight percent of the isobutyraldehyde was also introduced into the reaction zone. Ammonia at a rate of $6.6 \times 10^{-3}$ moles per minute and oxygen at the rate of $4.4 \times 10^{3}$ moles per minute were also introduced into the reaction zone.

The products produced were recovered and analyzed by gas chromatography to obtain the following results:

| Product: | Weight percent |
|---|---|
| Isobutyraldehyde | 2.5 |
| Methacrylonitrile | 56.2 |
| Isobutyronitrile | 10.1 |
| Acrylonitrile | 14.3 |
| Other | 16.9 |

EXAMPLE 2

The experiment was repeated, however the reactor was packed with an unimpregnated support identical to the support used in Example 1, a silica stabilized alumina. The reaction was repeated in substantially identical manner described in the preceding example and the crude reaction products were analyzed to indicate that the yield of methacrylonitrile was only 15 weight percent.

EXAMPLE 3

Example 1 was repeated using a catalyst comprising 0.6 weight percent palladium on an alumina support, $\frac{1}{16}$ inch extrudate having a specific surface of 188 square meters per gram. The reactants were supplied in the same relative proportions as described in Example 1 and the temperature was maintained at 315° C. The products condensed from the reaction comprised the following:

| Product: | Weight percent |
|---|---|
| Isobutyronitrile | 7.0 |
| Methacrylonitrile and acrylonitrile | 31.0 |
| Isobutenylisobutyraldehyde imine | 10.0 |

EXAMPLE 4

Example 1 was repeated using a catalyst comprising 6 weight percent nickel as nickel oxide on a silica alumina carrier comprising 83 weight percent silica and 17 weight percent alumina. The crude reaction product condensed in the Dry Ice trap contained the following:

| Product: | Weight percent |
|---|---|
| Isobutyraldehyde | 8 |
| Methacrylonitrile and acrylonitrile | 49 |
| Isobutyronitrile | 33 |
| Other | 10 |

EXAMPLE 5

Example 1 was carried out in the presence of steam at 428° C. The amount of catalyst charged to the reactor was 10 milliliters. The feed rates were adjusted to provide a molar ratio of aldehyde to water of 1.0. The crude reaction product condensed in the Dry Ice trap had the following composition:

| Product: | Weight percent |
|---|---|
| Isobutyraldehyde | 14 |
| Acrylonitrile | 18 |
| Acetonitrile | 2 |
| Methacrylonitrile | 61 |
| Isobutyronitrile | 5 |

Less than 1.0 percent of the aldehyde reactant supplied to the reaction zone was converted to carbon dioxide as determined by the weight increase in the solid sodium hydroxide trap.

When the examples are repeated with substitution of other aldehydes for the isobutyraldehyde, e.g., propionaldehyde or valeroaldehyde, substantially the same yields of acrylonitrile and 2-pentenenitrile, respectively, can be obtained.

The preceding examples are intended solely to illustrate a mode of practice of the invention and are not to be construed as unduly limiting of the invention.

I claim:

1. The method for the production of unsaturated nitriles from saturated aldehydes of the following structure:

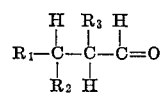

wherein:

$R_1$ $R_2$ and $R_3$ are hydrogen, alkyl or aryl and the total number of carbon atoms is from 3 to about 15 that comprises contacting in a reaction zone said aldehyde, ammonia and oxygen in the presence of a catalyst comprising a Group VIII metal, oxide, halide, nitrate, sulfate or phosphate thereof at a temperature from about 200° to about 800° C. and a pressure from about 1 to 1000 atmospheres.

2. The method of claim 1 wherein said catalyst also contains a Group VI-B metal, oxide, halide, nitrate, sulfate, or phosphate thereof.

3. The method of claim 2 wherein said catalyst is a combination of nickel and molybdenum oxides.

4. The method of claim 1 wherein said Group VIII metal catalyst is nickel.

5. The method of claim 1 wherein a promoter selected from the class consisting of halogens, hydrogen halides and halogenated hydrocarbons having from 1 to about 5 carbons and capable of forming free radicals at temperatures in said reaction zone, is introduced into said reaction zone in an amount equal to 0.001–5 weight percent of the reactant feed.

6. The method of claim 5 wherein said halogenated hydrocarbon promoter is chloroform.

7. The method of claim 5 wherein the reaction temperature is from about 350° C. to about 500° C.

8. The method of claim 5 wherein said catalyst also contains a Group VI–B metal, oxide, halide, nitrate sulfate or phosphate thereof.

9. The method of claim 5 wherein water vapor is also introduced into said reaction zone in an amount to give a volume percent concentration of 1–25 percent of the total vapor phase.

10. The method of claim 1 wherein water vapor is also introduced into said reaction zone in an amount to give a volume percent concentration of 1–25 percent of the total vapor phase.

11. The method of claim 1 wherein said catalyst is supported on a metallo aluminum silicate having a crystalline structure and a uniform pore diameter from 4 to 15 Angstrom units.

12. The method of claim 1 wherein said aldehyde is isobutyraldehyde and said unsaturated nitrile is methacrylonitrile.

13. The method of claim 1 wherein said saturated aldehyde is propionaldehyde and said unsaturated nitrile is acrylonitrile.

14. The method of claim 1 wherein said catalyst is supported on an inert solid carrier and the reaction is conducted under vapor phase reaction conditions.

15. The method of claim 14 wherein said catalyst is supported on an alumina, alumina-titania or alumina-zirconia carrier.

16. The method of claim 14 wherein said catalyst is supported on a silica, silica-titania, silica-zirconia or silica-alumina carrier.

References Cited

UNITED STATES PATENTS

| | | | |
|---|---|---|---|
| 2,412,437 | 12/1946 | Wagner | 260—465.9 |
| 2,691,037 | 10/1954 | Bellringer et al. | 260—465.9 |
| 2,701,260 | 2/1955 | Hagemeyer | 260—465.9 |
| 2,734,909 | 2/1956 | Gee et al. | 260—465.9 |
| 3,365,482 | 1/1968 | Khoobiar | 260—465.9 XR |

CHARLES B. PARKER, Primary Examiner

S. T. LAWRENCE III, Assistant Examiner

U.S. Cl. X.R.

260—465, 465.7